United States Patent [19]

Meixner

[11] 4,072,960
[45] Feb. 7, 1978

[54] CAMERA WITH BATTERY TESTING DEVICE

[75] Inventor: Willi Meixner, Bunde, Germany

[73] Assignee: Balda-Werke Photographische Gerate und Kunststoff GmbH & Co. KG., Bunde, Germany

[21] Appl. No.: 615,335

[22] Filed: Sept. 22, 1975

[30] Foreign Application Priority Data

Sept. 26, 1974 Germany .................. 2445991

[51] Int. Cl.² .......................................... G03B 7/00
[52] U.S. Cl. ............................................ 354/60 L
[58] Field of Search ............ 354/60 L, 53, 23 R, 354/202, 219, 288, 289

[56] References Cited

U.S. PATENT DOCUMENTS

| 3,153,375 | 10/1964 | Zapp | 354/202 X |
|---|---|---|---|
| 3,699,857 | 7/1970 | Wagner et al. | 354/60 L |
| 3,742,831 | 7/1973 | Cator et al. | 354/23 |
| 3,836,985 | 9/1974 | Lange | 354/288 |
| 3,849,769 | 11/1974 | Chiba | 354/60 L |

FOREIGN PATENT DOCUMENTS

| 1,193,447 | 4/1959 | France | 354/60 L |
|---|---|---|---|
| 47-32456 | 8/1972 | Japan | 354/60 L |

*Primary Examiner*—L. T. Hix
*Assistant Examiner*—W. J. Brady
*Attorney, Agent, or Firm*—Blum, Moscovitz, Friedman & Kaplan

[57] ABSTRACT

A camera incorporating a light-meter and a battery-powered lamp for indicating when the level of incident light is so low as to be unsuitable for photography also includes means for determining the state of charge of the battery. The possibility of making an erroneous determination of the state of charge of the battery as the result of failing to cover the photosensitive element during the determination of the state of charge is eliminated.

14 Claims, 4 Drawing Figures

CAMERA WITH BATTERY TESTING DEVICE

BACKGROUND OF THE INVENTION

In conventional cameras, during determination of the state of charge of the battery, it is necessary to cover the photoelectric cell by hand during actuation of a switch or key to note whether a warning or control lamp lights up when the photoelectric element is screened off. When the test is carried out properly, activation of the control lamp to its normal level of intensity indicates that the battery is at a satisfactory state of charge, i.e. at a satisfactory voltage. The difficulty with this type of arrangement is that an inexperienced camera user may on occasion forget to screen off the photoelectric cell when actuating the switch or key, or may screen off the photoelectric element only incompletely. A test result obtained under such conditions may lead to unnecessary, premature replacement of the battery.

As is evident, then, it would be desirable that the camera be so constructed that the photosensitive element be automatically screened off whenever the battery test switch or key is actuated. In other words, the actuation of a single testing key should be sufficient for achieving the desired test result without any additional manipulation.

SUMMARY OF THE INVENTION

A camera having a photosensitive element and battery-powered circuitry for controlling the exposure of the film in accordance with the incident light level is fitted with a cover which in the normal closed position covers both the lens and the photosensitive element. Actuation means are provided by means of which the cover can be removed from the lens and the photosensitive element so that a picture can be taken. The actuation means can also be used to close a switch which places the battery in series with a lamp so that the intensity of the light emitted by the lamp can be used as an indication of the state of charge of the battery.

The circuitry of the camera uses the response of the photosensitive element to provide an exposure in taking a picture which will be appropriate to the level of incident light. When the level of incident light is too low for proper exposure of the film, indication of this fact is given by illumination of a warning lamp. In a preferred embodiment of the invention a single lamp is used both as the warning lamp and for indicating the state of charge of the battery.

The activation means is so constructed that when the switch is closed to determine the state of the charge, the photosensitive element is covered, thereby eliminating any possibility of incident light affecting the intensity of illumination of the lamp. In one embodiment of the invention the activation means is a sliding plate which in normal position covers the lens and the photosensitive element, in open position allows incident light to reach both the lens and the photosensitive element, and in test position closes the switch for putting the battery in series with a lamp to indicate the state of charge of the battery. A light path is provided adjacent the lens so that the level of illumination of the lamp can be seen. Preferably, the plate is spring-biased away from the contact switch to avoid accidental closing of said switch.

In a second embodiment of the invention, a hinged visor is provided over the photosensitive element. This visor is raised by movement of the actuating means in a first direction so that a picture may be taken with light falling both on the lens and the photosensitive element. Movement of the actuating means in a second direction which is different from that of the first direction closes the battery-test switch for operating as is the case with the first embodiment while maintaining the photosensitive element in shielded condition.

Accordingly, an object of the present invention is an improvement in a camera which provides both for automatic exposure control by means of a photosensitive element and for testing of the camera battery with respect to its state of charge.

Another object of the present invention is an improvement in a camera which provides for measuring the state of charge of the camera battery without the possibility of introduction of error as the result of incident light falling on a photosensitive element.

A further object of the present invention is an improved camera in which a single actuating means is used both for placing the camera in operating status and for battery test.

An important object of the present invention is an improved camera which provides indications as to when the light level is either too low or too high for proper exposure of the film.

Still other objects and advantages of the invention will in part be obvious and will in part be apparent from the specification.

The invention accordingly comprises an article of manufacture possessing the features, properties, and the relation of elements which will be exemplified in the article hereinafter described, and the scope of the invention will be indicated in the claims.

BRIEF DESCRIPTION OF THE DRAWINGS

For a fuller understanding of the invention, reference is had to the following description taken in connection with the accompanying drawings, in which.

DESCRIPTION OF THE PREFERRED EMBODIMENTS

Figure 1:
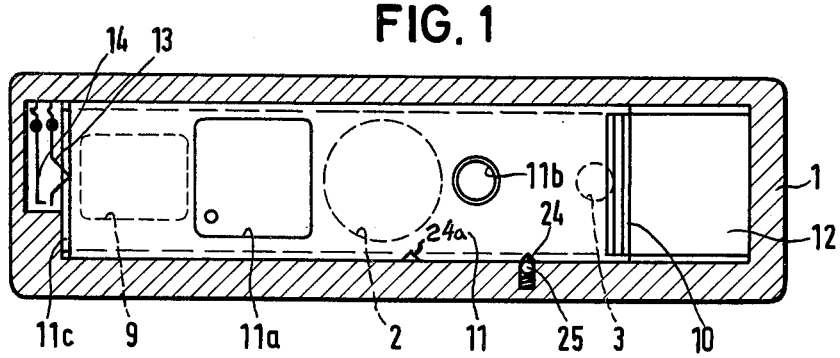
FIG. 1 is a sectional view through a camera housing in accordance with the invention, the section being taken forward of the lens.

Referring to FIG. 1, camera housing 1 has therein lens 2, photoelectric cell 3 and finder 9 behind a slide 11 which is displaceable by means of grip 10. In normal, closed position, slide 11 covers both lens 2 and photosensitive element 3 as well as finder 9. To bring the camera into operating condition, slide 11 is moved toward the right as shown in FIG. 1, simultaneously uncovering finder 9, bringing square opening 11a in registry with lens 2 and opening 11b in registry with photosensitive element 3. Two notches 24 and 24a in cooperation with spring loaded ball 25 in a recess in camera housing 1 serve as detents for holding slide 11 respectively in closed and opened position.

Figure 3:
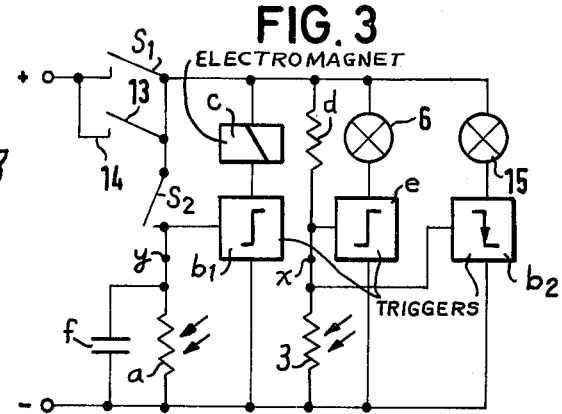
FIG. 3 is a diagrammatic representation of the circuitry of the camera.

Slide 11 may also be moved toward the left as shown in FIG. 1 to close the switch consisting of contacts 13 and 14, contacts 13 being spring-biased toward the open position. Closing of this switch as shown in FIG. 3 puts lamp 6 and trigger $e$ across the full battery voltage. Photosensitive element 3 is a photoresistor. Since the construction of the slide 11 is such that photoresistor 3 is completely shielded from light when the switch consisting of contacts 13 and 14 is closed, photoresistor 3 is non-conductive. As a result, the point indicated by the reference character $x$ is positive and the resistance of trigger $e$ is low. Consequently, essentially the full voltage of the battery is placed across lamp 6 and the state of charge of the battery is indicated by the light output of lamp 6.

Figure 2:
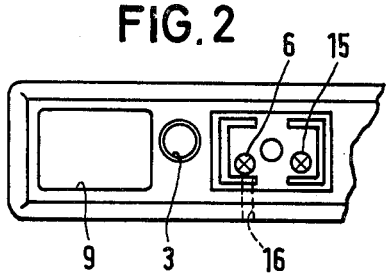
FIG. 2 is a front view of a second embodiment of a camera in accordance with the present invention.
Figure 4:
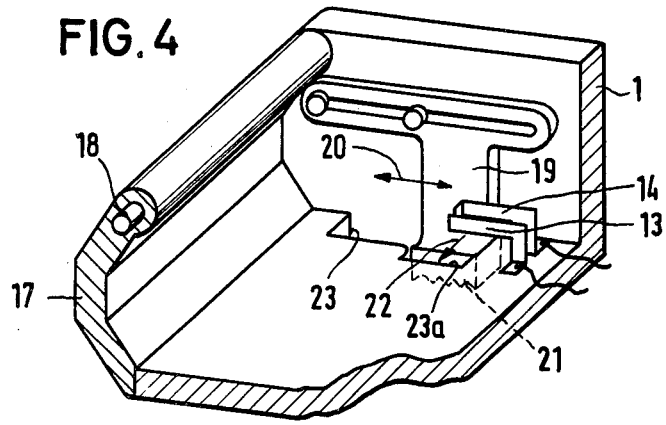
FIG. 4 is a partial view in perspective of the actuating means of the second embodiment of the present invention.

FIG. 2 is a front view of a camera which uses a hinged visor, the visor in closed position covering the finder 9, photosensitive cell 3, a window for the imaging of the luminous frame, and the range meter. The visor has been omitted from this Figure but is shown in FIG. 4. Also visible are two warning lamps 6 and 15, warning lamp 6 serving to show that the level of incident light relative to the aperture selected is too low to give a proper exposure with any of the shutter speeds available and warning lamp 15 serving to show that the level of incident light is too high for the diaphragm opening selected to give a proper exposure with any of the shutter speeds available. A light path 16 is provided for conducting the light from warning lamp 6 to the exterior of the camera housing so that the level of light output by the warning lamp 6 can be seen even with the visor closed. The light path may consist of an open conduit or a rod of transparent plastic or glass, etc.

FIG. 4 is an internal view in perspective of the actuation mechanism for operating both the hinged visor 17 and closing switch contacts 13 and 14. Visor 17 rotates about shaft 18 which is mounted on the side walls of the camera housing 1. A slide 19 is mounted on the interior of camera housing 1 so that it can move toward and away from visor 17, respectively, to open said visor and to allow same to close. Slide 19 has an actuation grip 21 which projects out from the body of the camera so that it can be manipulated from the exterior of the housing. As shown in FIG. 4, slide 19 is in one end position and visor 17 is held closed by a spring (not shown). When moved toward the left, visor 17 is spring-biased against the motion of slide 19. The slot 23 has a wider portion 23a which is in registry with the lower end of slide 19 when the visor 17 is in closed position. Movement of the slide 19 into the wider portion or recess 23a serves to close contacts 13 and 14 which are spring-biased toward the open position. It will be noted that slide 19 can be brought into the recess 23a only when visor 17 is in closed position, thereby insuring that no ambient light will fall upon photosensitive element 3 during the testing of the battery.

To facilitate entry of the bottom portion of slide 19 into recess 23a, the vertical portion of slide 19 may be of a flexible material such as a suitable plastic or a tempered metal. Alternatively, the two pins on which slide 19 moves in the direction of the double arrows may be loose enough with respect to slide 19 so that slide 19 can be rotated to bring the bottom portion thereof into said recess.

In FIG. 3, $S_1$ is a switch which is closed when the usual shutter release is only partially depressed. Naturally, the shutter release is fully depressed by the operation only when the light level is high enough so that photoresistor 3 is sufficiently conductive so that no contraindication is presented to the operator, under such circumstances. Current flows through resistor $d$ and photoresistor 3 from the positive to the negative terminals of the battery. When the light level is adequate for photography, the resistance of photoresistor 3 is low relative to that of resistor $d$ and the position indicated by the reference character $x$ becomes negative thus controlling trigger $e$ to block the passage of current and to keep lamp 6 dark. The triggers in the circuit of FIG. 3 may be of the well-known Schmitt-type, or flip-flops or any other suitable state-of-the-art device.

On the other hand, if the light falling on element 3 is of low intensity, the resistance of photoresistor 3 is high and position $x$ becomes positive, causing trigger $e$ to pass current, thus putting lamp 6 across essentially the full voltage of the battery so that lamp 6 lights up to serve as a warning of insufficient illumination. Trigger $b_2$ operates in the opposite fashion; when the light level is too high, a predetermined negative value at position $x$ is exceeded, causing trigger $b_2$ to become conductive so that lamp 15 lights. The operator of the camera must then reduce the size of the aperture to a setting where the lamp 15 is extinguished. In this way the largest aperture setting usable may be determined and, correspondingly, the fastest shutter speed for action pictures. It may also be desired to use a large aperture in order to reduce the depth of field.

Partial depression of the shutter release also closes switch $S_2$ which charges capacitor $f$. Position $y$ becomes positive rendering trigger $b_1$ conductive, as a result of which electromagnetic $c$ is activated and opens the shutter (not shown). Once the shutter is opened by the full operation of the shutter release, switch $S_2$ opens and the capacitor $f$ proceeds to discharge through photoresistor $a$ located within or a part of photoresistor 3. The rate of discharge depends on the amount of light falling on photoresistor $a$. The stronger the light the lower the resistance and the more rapidly will capacitor $f$ be discharged. As capacitor $f$ is discharged, position $y$ becomes progressively less positive, until at a predetermined value, trigger $b_1$ cuts off the flow of current through electromagnet $c$. Deactivation of electromagnet $c$ releases the shutter which then returns to the closed position.

As will be seen from the above, a camera is provided with actuation means for selectively placing said camera in readiness for operation or testing the condition of the battery used to power the circuitry and the exposure mechanism. Moreover, in a preferred embodiment, a single lamp, in this case lamp 6, can be used at the choice of the operator for determining the state of charge of the battery or for establishing whether the diaphragm opening is too small for the light level and the shutter speeds available. Also, the possibility of error in determining the state of charge of the battery by failure to protect from incident light the photosensitive element used for determining the exposure is completely eliminated.

It will thus be seen that the objects set forth above, among those made apparent from the preceding description, are efficiently attained and, since certain changes may be made in the above article without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improvement in a camera having a lens, a first photosensitive element for measuring the level of light incident thereon, a battery and circuit means for operably connecting said element and said battery, said circuit means including a warning lamp and first trigger means, wherein said improvement comprises actuation means having a closed position, an open position and a battery-test position, said circuit means including switch means for selectively connecting said battery across said warning lamp and first trigger means in series, said actuation means being so constructed that in said closed position said element is screened from all sources of light and said switch means is open, in said open position said lens and element are exposed to incident light and said switch means is open, and in said battery-test position said element is screened from all sources of light and said switch means is closed for connecting said warning lamp and first trigger means in series with said battery, and for rendering said first trigger means conductive so that said battery can drive current through said warning lamp, said warning lamp being positioned so that light output therefrom is visible when said actuation means is in said battery-test position, the light output of said warning lamp serving to indicate the state of charge of said battery.

2. The device as claimed in claim 1, wherein said circuit means includes a fixed resistor in series with said photosensitive element, said resistor and element being in parallel with said warning lamp and first trigger means, the junction between said resistor and element being connected to said trigger means for activating and deactivating same depending on the voltage of said junction and thereby turn said warning lamp on or off when said actuation means is in open position and said switch means is closed so that said warning lamp can selectively indicate if the light level incident on said element is incorrect for the operation of said camera.

3. The device as claimed in claim 2, wherein said circuit means includes a second warning lamp and is adapted so that one of said first-mentioned and second warning lamps indicates when the light level is too low for operation of the camera, the other warning lamp indicating when the light level is too high for operation of the camera.

4. The device as defined in claim 3, wherein said camera includes a variable speed shutter, a variable opening diaphragm, the other of said first-mentioned and said second warning lamps being so connected to said photosensitive element as to serve to indicate when the level of incident light is too great for the maximum shutter speed at a selected diaphragm opening.

5. The device as defined in claim 2, wherein said warning lamp can selectively indicate if the light level incident on said element is too low for operation of said camera.

6. The device as defined in claim 1, wherein the construction of the camera is such that said warning lamp is visible proximate said lens when said element is screened from incident light.

7. The device as defined in claim 1, wherein said camera has a sight window and said warning lamp is visible at said sight window.

8. The device as defined in claim 1, wherein said camera includes biasing means opposing movement of said actuating means into said battery test position.

9. The device as defined in claim 8, wherein said biasing means is a spring.

10. The device as defined in claim 1, wherein movement of said actuating means from said closed position to said open position and from said closed position to said battery-test position is in different directions.

11. The device as defined in claim 10, wherein said different directions are approximately at right angles to each other.

12. The device as defined in claim 1, wherein said actuating means is in the form of a slidable plate having openings therein corresponding to the position of said lens and said photosensitive element when said actuating means is in said open position.

13. The device as defined in claim 1, wherein said camera includes a hinged visor for covering said photosensitive element and said actuating means is so constructed and arranged as to remove said visor from said photosensitive element when moved to said open position.

14. The device as defined in claim 1, wherein said lens and said element are screened off from all sources of light when said actuation means are in said closed position.

* * * * *